(12) United States Patent
Hatano et al.

(10) Patent No.: US 6,263,462 B1
(45) Date of Patent: Jul. 17, 2001

(54) TESTING METHOD AND TESTER

(75) Inventors: Akiro Hatano; Naoyuki Kagami; Nobuya Matsubara, all of Fujisawa (JP)

(73) Assignee: International Business machines Corporation, Armonk, NY (US)

( * ) Notice: Subject to any disclaimer, the term of this patent is extended or adjusted under 35 U.S.C. 154(b) by 0 days.

(21) Appl. No.: 09/122,223

(22) Filed: Jul. 24, 1998

(30) Foreign Application Priority Data

Jul. 25, 1997 (JP) .................................................... 9-200158

(51) Int. Cl.$^7$ .................................................... G11C 29/00
(52) U.S. Cl. ............................................................ 714/723
(58) Field of Search ..................................... 714/718, 787, 714/761, 763, 719, 723, 704, 42, 54; 360/132, 133, 135; 369/260

(56) References Cited

U.S. PATENT DOCUMENTS

| | | | | |
|---|---|---|---|---|
| 5,798,883 | * | 8/1998 | Kim ........................................ | 360/31 |
| 5,943,640 | * | 8/1999 | Macpherson .......................... | 702/183 |
| 6,005,739 | * | 12/1999 | Yun .................................... | 360/77.04 |

* cited by examiner

*Primary Examiner*—Christine T. Tu
(74) *Attorney, Agent, or Firm*—Robert B. Martin

(57) ABSTRACT

The present invention relates to a testing method and tester which reliably flags errors in disk drives, thereby reducing disk failures. In the testing method and tester, a random error due to noise occurs anywhere in a sector (read)/cylinder (write), whereas a repeatable error occurs in a specific area on a disk. If a plurality of random errors occur in the same sector or cylinder, no flagging is performed if the occurrence positions are distant from each other.

6 Claims, 4 Drawing Sheets

TESTING METHOD AND TESTER

BACKGROUND OF THE INVENTION

1. Field of the Invention

The present invention relates to a testing method and tester which are used for a hard disk drive (HDD) or the like, and particularly to a tester and a testing method in which a defective portion on a disk is detected in the manufacturing process of a magnetic disk drive, and a flagging is performed so that the particular portion is not used.

2. Description of Related Art

In the HDD used as the external storage device of an information processing unit, more miniaturization and reliability are required. Specifically, in the manufacturing process (test process) of a magnetic disk unit, there is a process for finding a defect such as a flaw occurring in a disk before the shipment, and performing a flagging so that the particular portion is not used. This process is called a Surface Analysis Test (SAT), which is a test for finding a defect on a disk and performing a flagging so that the particular portion cannot be used.

A flaw or the like having occurred in a disk is determined to be a defect when it cannot be read or written in an actual read/writing operation, and a flagging is performed so that the corresponding area is not used after shipped, thereby making the corresponding area invisible from the outside (unusable). Expecting the occurrence of defects in the disk, a predetermined amount of buffer is reserved, and the flagging is performed until the buffer is exhausted. The disk is determined to be a failure if the buffer is exhausted.

In the conventional SAT, the flagging is performed as follows.

In reading, if a read is performed and a plurality of errors occur in the same sector, that sector is flagged regardless of position in the sector. A read is performed, and, for instance, an error up to one per one megabyte is allowed.

In writing, if a write is performed and a plurality of errors occur in the same cylinder, that cylinder is flagged (or on a track basis) regardless of position in the cylinder. Generally, most of the write errors are caused by a servo trouble. Since the servo trouble causes errors in a plurality of portions rather than one portion, the use of the cylinder itself is inhibited.

In the SAT of the conventional disk drive, a sector is flagged if a plurality of errors occur in the same sector when a read is performed; and a cylinder is flagged if a plurality of errors occur in the same cylinder when a write is performed. Accordingly, sectors/cylinders which need not be flagged depending on the contents of the error are flagged and increase flagging results in the increase of disk failures, leading to reduction in the throughput.

It is the object of the present invention to provide a testing method and tester which can reliably flag errors which need to be flagged, and can largely decrease flags which are not necessary, thereby enabling disk failures to be reduced.

SUMMARY OF THE INVENTION

The tester of the present invention finds a defective portion in a disk, and performs a flagging so that the particular portion is not used. The tester comprises a detecting means for detecting the area where the defective portion has occurred, and a means for determining, based on the output of the detecting means, whether or not it is an error which randomly occurs. If it is an error which randomly occurred, the tester does not perform the flagging.

The tester of the present invention finds a defective portion in a disk, and performs a flagging so that the particular portion is not used. The tester comprises a detecting means for detecting the area where the defective portion has occurred, and a means for determining, based on the output of the detecting means, whether or not it is an error which occurs in a specific area with a predetermined frequency. If it is an error which occurs in a specific area with a predetermined frequency, the tester performs the flagging.

The tester of the present invention finds a defect in a disk, and performs a flagging so that the particular portion is not used. The tester comprises a detecting means for detecting the area where the defective portion has occurred, and a means for determining, based on the output of the detecting means, whether it is a repeatable error or a non-repeatable error, and performs the flagging if it is a repeatable error, and does not perform the flagging if it is a non-repeatable error.

The detecting means may detect the occurrence area within a sector in a read operation and the occurrence area within a cylinder in a writing operation. The determination means may judge based on the number of errors having occurred within a predetermined distance.

Further, the above tester may determine whether to perform or not to perform the flagging based on the number of errors having occurred. The above test may perform the flagging before products are shipped.

The testing method of the present invention performs a test for finding a defective portion having occurred in a disk, and performs a flagging so that the particular portion is not used. The testing method first detects the area where the defective portion has occurred, then determines, based on the detection result, whether or not it is a random error and does not perform the flagging if it is an error which randomly occurred.

The testing method of the present invention performs a test for finding a defective portion having occurred in a disk, and performs a flagging so that the particular portion is not used. The testing method first detects the area where the defective portion has occurred, then determines, based on the detection result, whether or not it is an error which occurs in a specific area with a predetermined frequency, and performs the flagging if it is an error which occurs in a specific area with a predetermined frequency.

The testing method of the present invention is a testing method for performing a test for finding a defective portion having occurred in a disk, and performing a flagging so that the particular portion is not used. The testing method first detects the area where the defective portion has occurred, then determines, based on the detection result, whether it is a repeatable error or a non-repeatable error, performs the flagging if it is a repeatable error, and does not perform the flagging if it is a non-repeatable error.

The above detection may be such that the occurrence area within a sector is detected in a read operation and the occurrence area within a cylinder is detected in a writing operation, and the above determination may be made based on the number of errors having occurred within a predetermined distance.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

The tester of the present invention can apply to a small-sized HDD on which a plurality of heads for performing recording and reproducing to a recording medium are mounted.

Figures 1, 2:
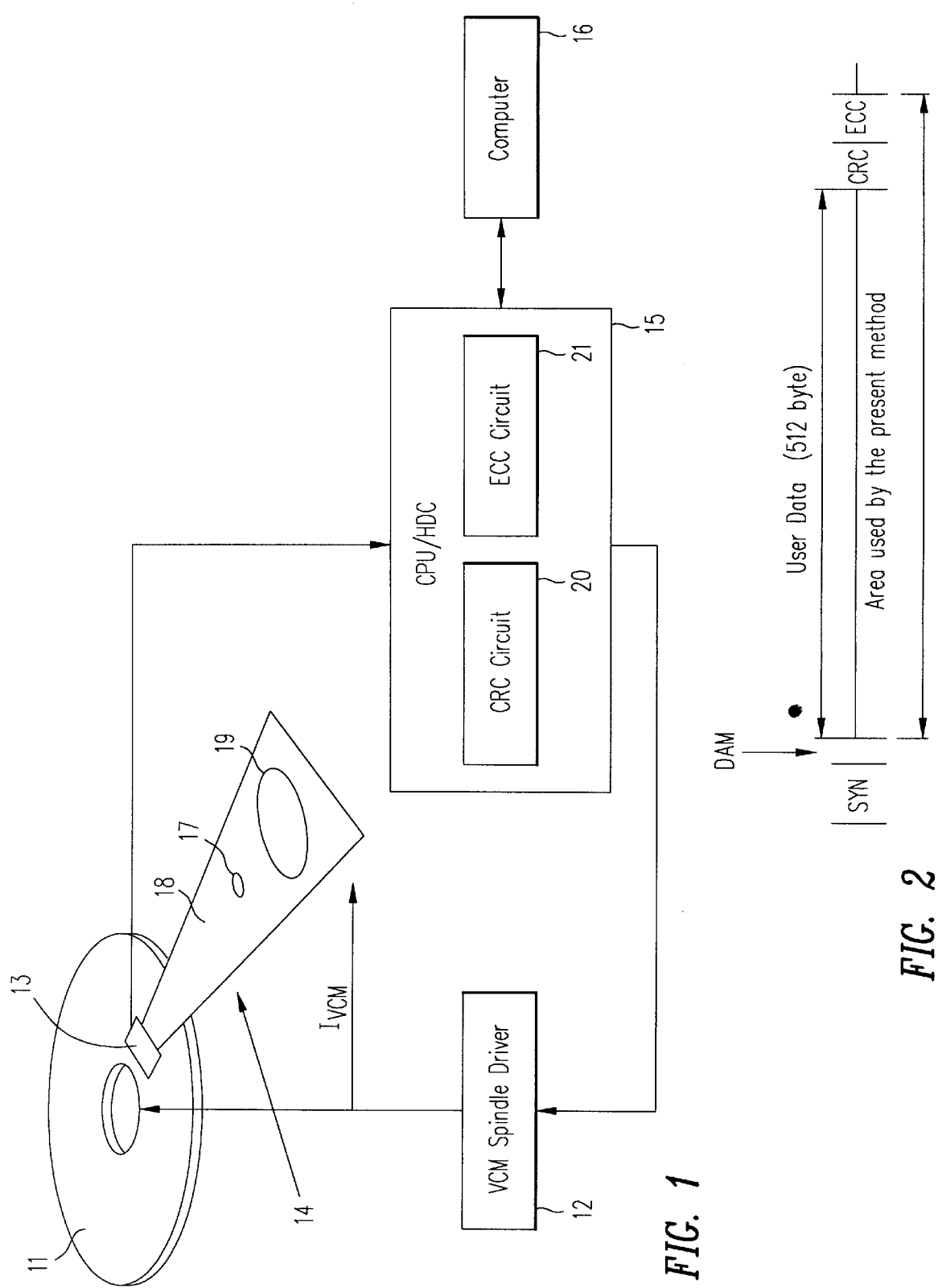
FIG. 1 is a block diagram showing a disk drive related to the embodiment of the present invention.
FIG. 2 is a diagram showing the structure of the data areas of a disk drive.

FIG. 1 is a block diagram showing the construction of the tester related to an embodiment of the present invention.

In FIG. 1, a disk drive 10 comprises a disk 11 such as a magnetic disk which is a data recording medium, a voice coil motor (VCM) spindle driver 12 including a spindle motor for rotatably driving the disk 11, a magnetic head 13 for performing data read/write on the disk 11, an actuator mechanism 14 for moving a head slider having the magnetic head 13 above the surface of the magnetic disk 11 and to a retract position, a CPU/hard disk controller (HDC) 15 for controlling the speed of the actuator and the operation such as data read/write on the disk 11, and a computer 16 (detecting means, determination means) for performing a data read/write on the disk 11 to perform a SAT for finding a flaw or the like on the disk 11 and performing a flagging to make that portion unusable.

On the surface of the disk 11, there are concentrically arranged tracks including a data region in which data is recorded, and a servo region in which servo data is prerecorded. One or a plurality of disks 11 are mounted.

The VCM spindle driver 12 is made up of a spindle motor for rotatably driving the disk 11, a counterelectromotive force detecting circuit for detecting a counterelectromotive force, and the like.

The actuator mechanism 14 has a head suspension mechanism (not shown), an arm 18 slidably supported by a pivot 17, and a VCM 19 for rotating the arm 18. Further, the VCM 19 is driven by a VCM driver circuit (not shown).

The CPU/HDC 15 comprises a CPU for performing the speed control of the actuator, a HDC for controlling the operations such as data read/write for the disk 11, an amplifier circuit for amplifying a position detection signal and a detection signal of the above counterelectromotive force or the like, a wave-shaping circuit, an analog-digital converter (ADC), a digital-analog converter (DAC), a cyclic redundancy check (CRC) circuit 20, and an ECC circuit 21, which are in modules.

The CRC circuit 20 performs a CRC check for read data by CRC for error detection. Further, the ECC circuit 21 analyzes the CRC to detect the error in received data. This code is capable of detecting not only random errors but also burst errors, and can also correct errors.

FIG. 2 is a diagram showing the structure of the data areas of the disk drive 10.

In FIG. 2, SYN is a synchronizing signal, DAM is a data address mark for indicating the timing of the start of data, a user data region of 512 bytes, CRC, and ECC, and the user data region, CRC, and ECC are areas used in the present method.

As described later, the computer 16 performs the SAT according to an algorithm in which even if a plurality of errors occur in the same sector or cylinder, no flagging is performed if the occurrence positions are distant from each other.

The method of SAT of the disk drive 10 is described below. First, the basic idea of the present invention is described.

The present invention pays attention to the fact that, in the SAT for the disk drive, the errors include a repeatable error due to a flaw on the disk or the like and a non-repeatable error caused by noise. The non-repeatable error caused by noise had no problem in most cases if a retry was made.

Since, in the conventional method, the number of occurrences of these errors were automatically compared with a predetermined number for each sector/cylinder to perform a flagging, flags tended to increase, leading to the increase of disk failures.

Recently, the error rate has worsened as the recording density of the disk drive has dramatically increased. By ignoring, to some extent, non-repeatable errors which have no problem if a retry is made, the flags for random errors caused by noise are greatly reduced.

Thus, as to the flagging performed during the SAT of the disk drive, the present invention does not perform the flagging for errors which randomly occur. Flagging is performed only for errors occurring in a specific area with a high frequency. That is, it does not merely check the number of occurrences of errors for each sector/cylinder, but it performs the flagging only for errors occurring in a specific area with a high frequency, as well as considering the occurrence areas (positions) of errors within a sector/cylinder.

Specifically, in a read operation, errors occurring in a specific area within a sector are flagged. If the errors occur in the same sector and the occurrence positions of the errors in the sector are distant from each other, they are deemed to be random errors and are not flagged. In a writing operation, errors occurring in specific servo sectors in a cylinder are flagged. If the errors occurs in the same cylinder and the positions of the servo sectors in the cylinders are distant from each other, they are deemed to be random errors and are not flagged.

Now, the SAT method for the disk drive is described in detail based on the above basic idea.

Figure 3:
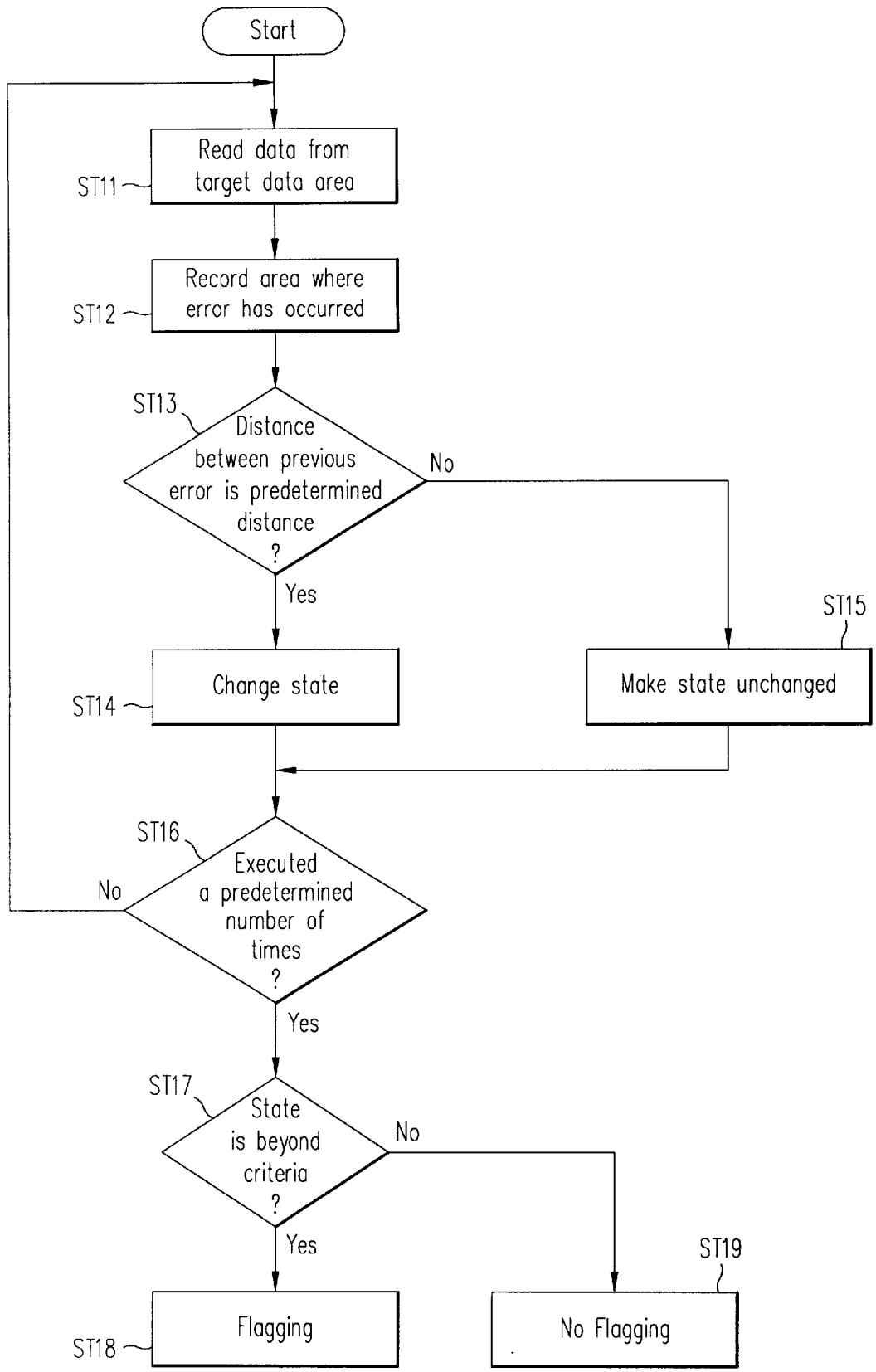
FIG. 3 is a flowchart showing the SAT of a disk drive.

FIG. 3 is a flowchart showing the SAT of the present method, and it shows an example in which the criteria of determination is that a read is performed eight times and there are three errors in eight bytes. In the figure, ST represents a step in the flow.

First, when the program is started, data is read from a target data area in step ST11, and in step ST12, the area where an error has occurred is recorded. Although, in this embodiment the area where the error has occurred is detected using the ECC, the error and the error area may be detected by performing a read compare for comparing read data. If the ECC is used, the error area can be immediately known; and it is faster compared with the read compare method.

In step ST13, a distance check is performed between the current error area and the previous error area. If the error is nearer than a predetermined distance, it is determined that the error may be a repeatable error and the state is changed in step ST14; and the process then goes to step ST16. If the error is farther than the predetermined distance, it is determined that the error may be a non-repeatable error and the state is made to remain unchanged in step ST15; and the process goes to step ST16.

In step ST16, it is determined whether or not the above error distance check has reached a predetermined number of times (for instance, eight times), and the above process is repeated until the above error distance check reaches the predetermined number of times.

When the error distance check reaches the predetermined number of times, it is determined in step ST17 whether or not the state is equal to or larger than a predetermined criteria. If the state is equal to or larger than the predetermined criteria, a flagging is performed in step ST18; otherwise, no flagging is performed in step ST19.

FIGS. 4 to 7 are diagrams showing SAT examples in which a read is performed eight times, and the determination criteria is the case in which there are three errors in eight bytes.

Figure 4:
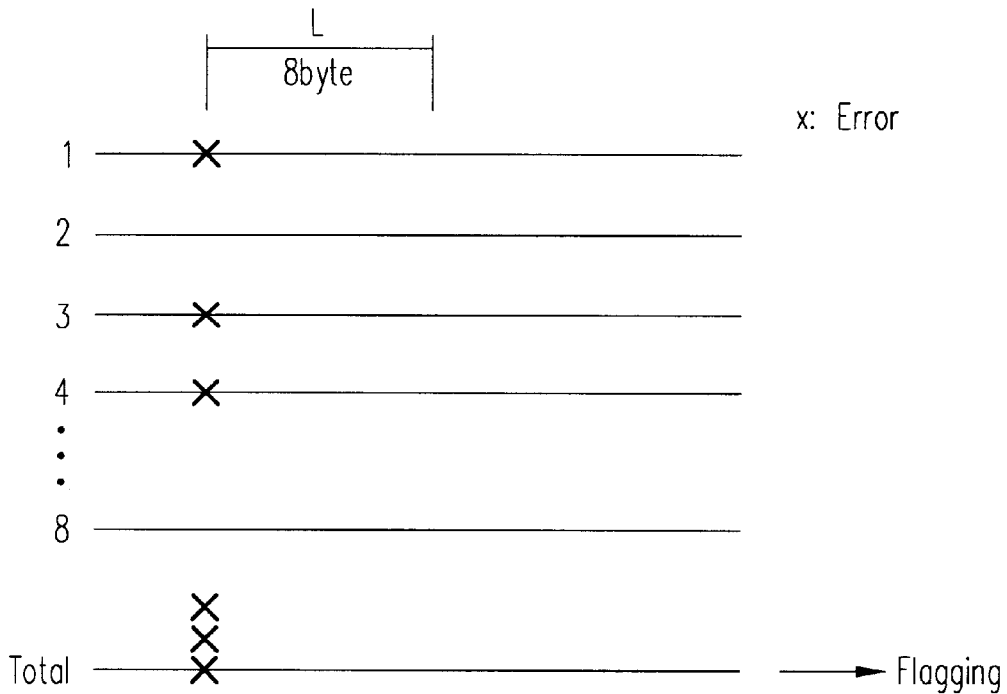
FIG. 4 is diagram showing a SAT example of a disk drive.

In FIG. 4, the error occurs three times in the same portion, and it is flagged. This error is considered to be a repeatable error. In this embodiment, if there are three errors in a predetermined distance L (eight bytes), then a flagging is performed and no further reading is performed.

Figure 5:
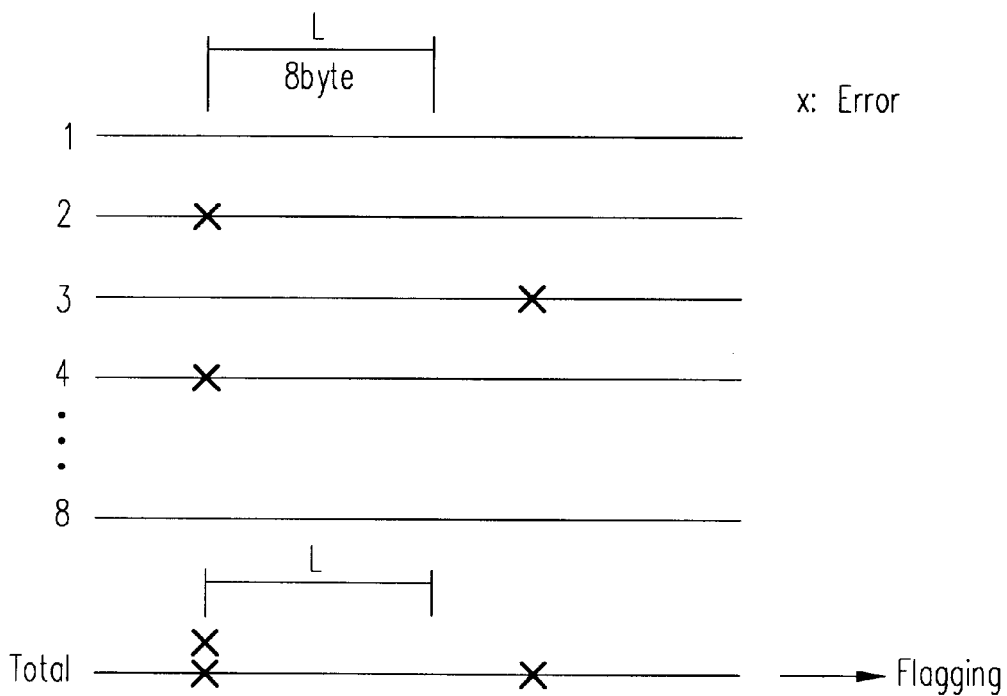
FIG. 5 is a diagram showing a SAT example of a disk drive.

FIG. 5 shows a case in which no flagging is performed, because, although there are three errors in total, there are two errors in the predetermined distance L (eight bytes). This error is considered to be a non-repeatable error, for which a flagging is performed in the background art. In most cases, such error is a random error caused by noise and it is not repeatable; and, thus, the error does not appear if a retry is performed. Since this area is not flagged, disk failures can be reduced.

Figure 6:
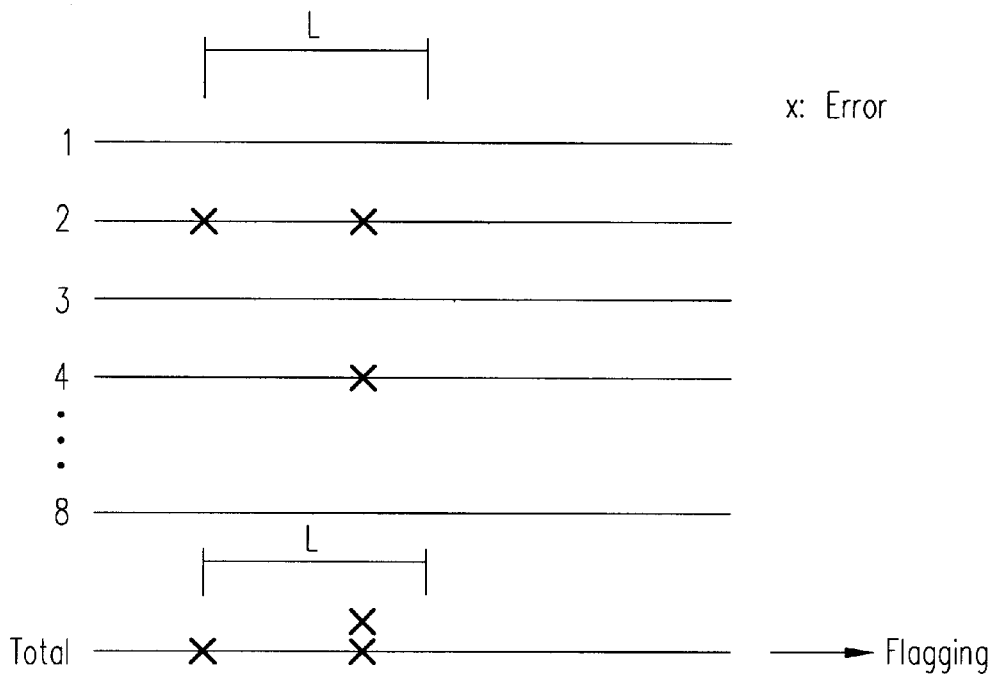
FIG. 6 is a diagram showing a SAT example of a disk drive.
Figure 7:
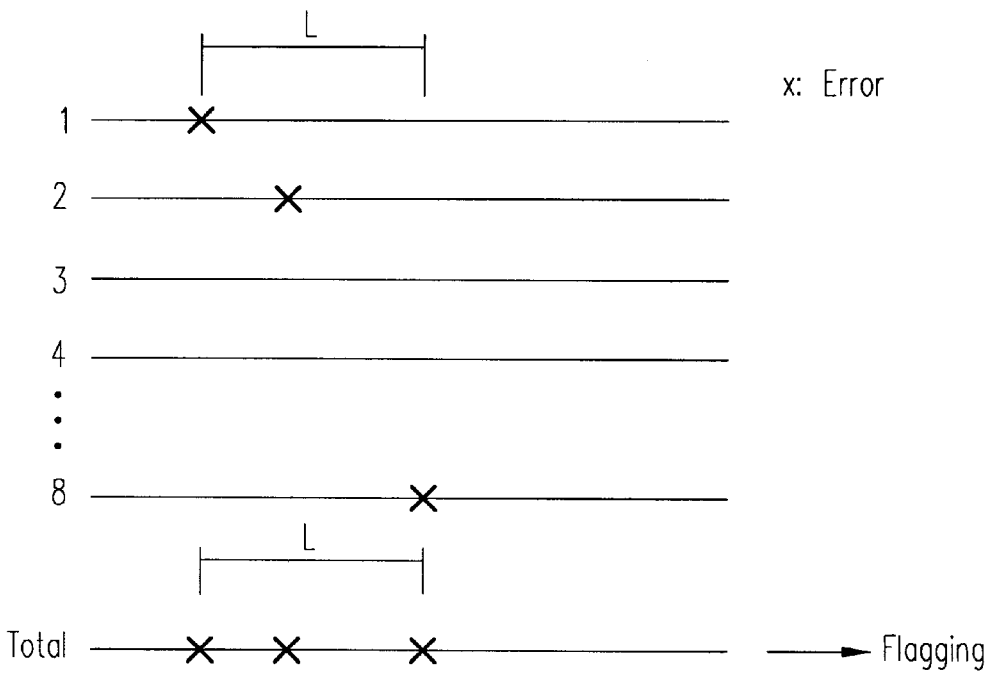
FIG. 7 is a diagram showing a SAT example of a disk drive.

FIGS. 6 and 7 show a case in which a flagging is performed, because there are three errors in total and they are in a predetermined distance L (eight bytes). In such case, a flagging is performed as in the background art because the frequency of error occurrences is more than a prescribed value.

In addition, in any of the above cases, a read is performed eight times, and no flagging is performed if the number of errors is two or less. Further, no further reading is performed after the flagging thereby to save time.

Although the description has been made to the reading, it is similarly applied to the writing.

As described above, in the tester and testing method of the present embodiment, a random error due to noise occurs anywhere in a sector (read)/cylinder (write) whereas a repeatable error occurs in a specific area on a disk, and thus even if a plurality of errors occur in the same sector or cylinder, no flagging is performed if the occurrence positions are distant from each other. Accordingly, the flags for random errors due to noise can be largely reduced. That is, the flagging is reliably performed for errors requiring flags, while flags which are not always necessary can be largely reduced, whereby disk failures can be reduced.

Although, in this embodiment, description has been made to an example in which the present invention is applied to the HDD, the present invention is not limited to this, but it can be applied to any apparatus and method for flagging defects occurring in a disk. For instance, it may be used with an external storage device other than the HDD, such as magneto-optic disk, and an advantage similar to the above described embodiment can be obtained.

Further, in this embodiment, a read is performed eight times, and a judgment is made as to the case in which there are three errors in eight bytes in distance L, but any method may be used as long as it detects the areas where errors have occurred, and the number of errors, combination pattern, distance L, and number of reads are not limited.

Further, in this embodiment, error portions are detected using the ECC, but they may be detected by the read compare.

In addition, it is needless to say that the computer constituting the above disk drive, and the types and number of the CPU/HDC and the like are not limited to the above described embodiment.

The tester and testing method of the present invention provides a detecting means for detecting the area where a defective portion has occurred, and a means for determining, based on the output of the detecting means, whether or not it is an error which randomly occurs. No flagging is performed if it is an error which randomly occurred, whereas a flagging is performed if it is an error which occurs in a specific area with a predetermined frequency. Accordingly, the flagging is ensured for an error which needs to be flagged, while flags which are not always necessary can largely be decreased, thereby reducing disk failures.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A testing method for finding a defective area in a disk, and performing a flagging so that the defective area is not used, the method comprising the steps of:

(i) detecting an area of the disk in which an error occurs;
  (ii) determining whether the error is random based on the number of errors having occurred in a predetermined distance; and
  (iii) performing a flagging for errors which are not random.

2. A testing method as set forth in claim 1, wherein in the detecting of the area of the disk where the errors occur, the area within a sector is detected in a read operation, and the area within a cylinder is detected in a writing operation.

3. A testing method for finding a defective area in a disk, and performing a flagging so that the defective area is not used, the method comprising the steps of:
 (i) detecting an area of the disk in which errors occur;
 (ii) determining whether the errors occur in a specific area with a predetermined frequency based on the number of errors having occurred in a predetermined distance; and
 (iii) performing a flagging for errors which occur in the specific area with a predetermined frequency.

4. A testing method as set forth in claim 3, wherein in the detecting of the area of the disk where the errors occur, the area within a sector is detected in a read operation, and the area within a cylinder is detected in a writing operation.

5. A testing method for finding a defective area in a disk, and performing a flagging so that the defective area is not used, the method comprising the steps of:
 (i) detecting an area of the disk where an error occurs;
 (ii) determining whether it is a repeatable error based on the number of errors having occurred in a predetermined distance; and
 (iii) performing a flagging for errors which are repeatable errors.

6. A testing method as set forth in claim 5, wherein in the detecting of the area of the disk where the errors occur, the area within a sector is detected in a read operation, and the area within a cylinder is detected in a writing operation.

* * * * *